United States Patent

Arisaka et al.

[15] 3,698,299

[45] Oct. 17, 1972

[54] ELECTRONIC SHUTTER FOR PHOTOGRAPHIC CAMERA EQUIPPED WITH EXPOSURE CONDITION CHECKING CIRCUIT AND EXPOSURE TIME CONTROL CIRCUIT

[72] Inventors: Kunio Arisaka, Tokyo; Toshikazu Takizawa, Saitama, both of Japan

[73] Assignee: Kabushiki Kaisha Koparu, Tokyo, Japan

[22] Filed: Sept. 14, 1970

[21] Appl. No.: 71,769

[30] Foreign Application Priority Data

Sept. 19, 1969 Japan ................44/89248

[52] U.S. Cl. ............................................95/10 CT
[51] Int. Cl. ...............................................G03b 17/18
[58] Field of Search..................95/53 EB, 10 CT

[56] References Cited

UNITED STATES PATENTS

| | | |
|---|---|---|
| 3,502,011 | 3/1970 | Rentschler et al........95/53 EB |
| 3,437,026 | 4/1969 | Espig........................95/53 EB |
| 3,502,010 | 3/1970 | Kennel.....................95/10 CT |
| 3,487,757 | 1/1970 | Kiper........................95/10 CT |
| 3,460,450 | 8/1969 | Ogihara....................95/53 EB |
| 3,397,629 | 8/1968 | Mori et al.................95/10 CT |

*Primary Examiner*—Samuel S. Matthews
*Assistant Examiner*—Russell E. Adams, Jr.
*Attorney*—Otto John Munz

[57] ABSTRACT

An electronic shutter for a photographic camera having electronic circuitry including an exposure-condition checking circuit and an exposure-time control circuit. These circuits are arranged so that, upon depression of the release button of the camera, the power switch of said electronic circuitry is closed first to connect the checking circuit to the power source by a changeover switch. A further depression of the button causes said changeover switch to be switched from said checking circuit to the exposure time control circuit. Finally, the shutter operating mechanism is released by said button. Throughout the exposure effected by the shutter, both the power switch and the changeover switch are held locked at the position in which said exposure time control circuit is formed by the shutter operating members.

1 Claim, 2 Drawing Figures es,698,299

ELECTRONIC SHUTTER FOR PHOTOGRAPHIC CAMERA EQUIPPED WITH EXPOSURE CONDITION CHECKING CIRCUIT AND EXPOSURE TIME CONTROL CIRCUIT

BACKGROUND OF THE INVENTION

1. Field of the Invention

The present invention is concerned with an electronic shutter for a photographic camera, and more particularly, it relates to an electronic shutter equipped with a circuit for checking exposure conditions, for use in photographic camera.

2. Description of the Prior Art

An electronic shutter for a photographic camera has previously been designed to function so that the length of time in which the shutter blades are held open is controlled by electronic circuitry. One of the features of such an electronic shutter resides in the fact that it can control the exposure time through a wide range. However, the speed at which the shutter blades are operated is limited ultimately by factors such as the friction between the sliding members and the inertia of the shutter blades. Therefore, it is impossible to control the exposure time smaller than a certain length, perhaps about 1/1000 second. Accordingly, in case the object to be photographed is extremely bright, the photograph obtained would be over-exposed. On the other hand, known electronic shutters can control a long exposure time up to the order of 30 seconds. It should be understood, however, that an exposure performed without the use of a tripod but requiring an excessively long exposure time is subject to shaking of the camera. It would, therefore, be convenient for the photographer if he could confirm or check - prior to taking a photograph - that there is no danger from over-exposure or from shaking of the camera. One technique which has made such checking possible is disclosed in U.S. Pat. No. 3,460,450.

In performing such checking, it would be advantageous to arrange so that, during the initial stage of the operation to release the releasing button of the shutter mechanism of the camera, a checking circuit would be formed upon the closure of the power switch of the electronic circuitry to thereby allow this checking to be performed, and that, during the next stage of said releasing operation, the electric connection would be switched, by a changeover switch, from the checking circuit to the exposure time control circuit, and that, during the final stage of said releasing operation, the shutter driving mechanism would be released. It should be noted, however, that this arrangement is inconvenient because, upon the removal of the depression of the release button during the period of exposure, the electric connection is again switched back from the exposure-time control circuit to the checking circuit and the exposure is completed. In order to eliminate this inconvenience, it is necessary to arrange that, after the electric connection has been switched from the checking circuit to the exposure-time control circuit, both the power switch of the electronic circuitry and the changeover switch are held locked by a separate locking member or members.

Also known is electronic circuitry having no checking circuit, that is to say, an arrangement wherein only the power switch of the exposure-time control circuit is locked by a specially provided locking means continuously until the exposure is completed. However, it is structurally disadvantageous to provide such an additional locking means.

SUMMARY OF THE INVENTION

It is, therefore, an object of the present invention to provide an electronic shutter equipped with electronic circuitry consisting of an exposure condition checking circuit and an exposure time control circuit and arranged to function so that, by the operation to release the shutter mechanism of the camera, the power switch of said electronic circuitry is closed first to form said checking circuit by a changeover switch, thereafter switching the electric connection from said checking circuit to the exposure time control circuit, and finally releasing the shutter driving mechanism.

Another object of the present invention is to provide an electronic shutter which is arranged so that both the power switch and the changeover switch are held locked until the exposure is completed in order that the control of the exposure time control circuit will not become ineffective.

Still another object of the present invention is to provide an electronic shutter which is arranged so that the locking of both of said power switch and said changeover switch is performed by a shutter operating member without the provision of any separate or particular locking means.

DESCRIPTION OF THE PREFERRED EMBODIMENT

Figure 1:
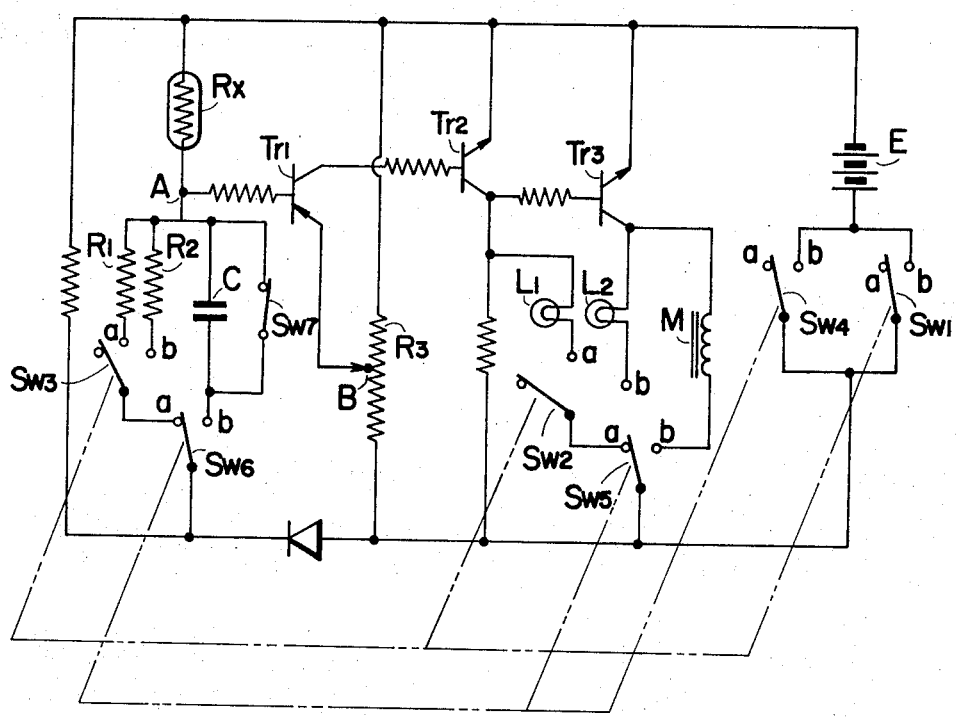
FIG. 1 is a diagram of a circuit showing one example of the electronic circuitry for use in the electronic shutter of the present invention.

In FIG. 1, two power switches $SW_1$ and $SW_4$ are provided in parallel with each other in the circuit of a power source E. One switch $SW_1$ of these two power switches is intended for a checking circuit assigned for detecting whether or not the exposure condition is proper. This power switch $SW_1$ is interlocked with changeover switches $SW_2$ and $SW_3$. The other switch $SW_4$ of the power switches is intended for an exposure-time control circuit, and is interlocked with switches $SW_5$ and $SW_6$ which are capable of changing the connection from the checking circuit to the exposure-time control circuit and vice versa, respectively.

A photoconductive element or photocell $Rx$ is capable of changing its resistance value in proportion with the brightness of the object to be photographed. A resistor $R_1$ is selected so as to have a resistance value by referring to the minimum exposure time (for example 1/1000 second) which can be controlled by the camera used. A resistor $R_2$ is selected so as to have a resistance value by referring to the exposure time (for example less than 1/30 second) which is a length of time that can introduce the effect of camera-shake in the exposure. Together with said photocell $Rx$, a capacitor C forms an RC delay circuit. A switch $SW_7$ which is connected in parallel with the capacitor C serves to discharge the capacitor C. Upon this switch $SW_7$ being opened, the controlling action of the aforesaid delay circuit is started. A potentiometer $R_3$ is adapted to regulate the potential of the emitter electrode of a transistor $Tr_1$. It will, therefore, be convenient if this potentiometer $R_3$ is used in the setting of the degree of opening of the diaphragm and the setting of the light-sensitivity of the film. The transistor $Tr_1$ is turned ON whenever the potential of the point A becomes lower than the potential of the point B. A transistor $Tr_2$ is turned ON whenever the transistor $Tr_1$ is turned ON. A transistor $Tr_3$ is turned OFF whenever the transistor $Tr_2$ is turned ON. The connection between an over-exposure detecting lamp $L_1$ and the camera-shake detecting lamp $L_2$ is switched over from one another by a changeover switch $SW_2$. A known electromagnet M is capable of holding the shutter blades (not shown) in their fully open positions so long as this electromagnet M is energized.

Figure 2:
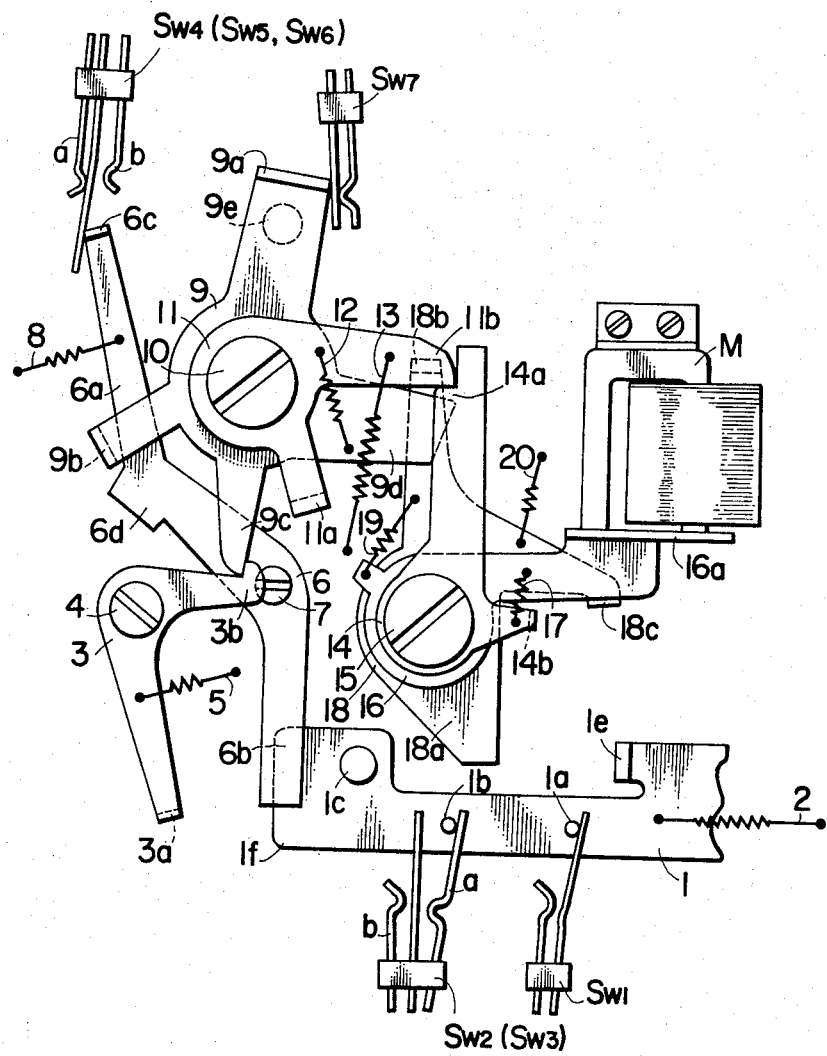
FIG. 2 is a diagrammatic representation, showing an example of the electronic shutter of the present invention.

In FIG. 2, a releasing member 1 has pins 1a, 1b and 1c, a bent portion 1e and an end portion 1f, and is normally urged to move toward the right side by a spring 2. An open-shutter locking lever 3 has a bent portion 3a and a hook portion 3b, and is rotatably mounted on a shaft 4. A spring 5 normally urges said open shutter locking lever 3 to rotate counter-clockwise. A changeover lever 6 has arms 6a and 6b, and is rotatably mounted on a shaft 7. The arm 6a is provided with a bent portion 6c and a stepped portion 6d. A spring 8 normally urges the changeover lever 6 to rotate counter-clockwise.

A shutter opening and closing lever which will hereinafter be referred to as a shutter operating lever 9 has bent portions 9a and 9b, arms 9c and 9d, and a pin 9e, and is rotatably mounted on a shaft 10. Said pin 9e is interlocked either directly or indirectly with the shutter blades which are not shown. Accordingly, as the shutter operating lever 9 is rotated counter-clockwise in FIG. 2, this rotation causes the shutter blades to open. Likewise, as this lever 9 is rotated clockwise, the shutter blades are closed. A shutter-closing driving lever 11 has a bent portion 11a and an arm 11b, and is rotatably mounted on said shaft 10. A spring 12 has one end which is secured to said shutter operating lever 9 and the other end which is secured to said shutter-closing driving lever 11.

A closed-shutter locking lever 14 has a stepped portion 14a which is adapted to be brought into engagement with the arm 11b of the shutter-closing driving lever 11, and also has a bent portion 14b, and is rotatably mounted on a shaft 15. A magnet lever 16 has a bent portion 16a which is adapted to be brought into contact with the electromagnet M, and is rotatably mounted on said shaft 15. A spring 17 has one end which is secured to said closed-shutter locking lever 14 and the other end which is secured to the magnet lever 16. A holding lever 18 has an arm 18a, and bent portions 18b and 18c, and is rotatably mounted on said shaft 15. A spring 19 has one end which is secured to the magnet lever 16 and the other end which is secured to the holding lever 18. A spring 20 normally urges said holding lever 18 to rotate counter-clockwise.

The switch $SW_2$ ($SW_3$) in FIG. 2 is shown as one which serves the combined functions of the two switches $SW_2$ and $SW_3$ in FIG. 1. Likewise, the switch $SW_4$ ($SW_5$) in FIG. 2 is shown as one which plays the combined role of the three switches $SW_4$, $SW_5$ and $SW_6$ in FIG. 1.

Description will hereinafter be directed to the operation of the circuitry of the present invention in connection with the illustrated embodiment of the shutter mechanism. FIG. 2 shows the shutter in its cocked state. In this state of the shutter mechanism, the release button of the camera may be depressed. Whereupon, the releasing lever 1 moves toward the left side against the force of the spring 2. This movement first causes the power switch $SW_1$ for the checking circuit to be closed. Along with this, the changeover switches $SW_2$ and $SW_3$ are connected to the terminals a, respectively. This means that the reference resistor $R_1$ for detecting over-exposure as well as the lamp $L_1$ both have been connected to a warning circuit. In such a state of the mechanism, if the light coming from the object of photography and impinging onto the photocell Rx is too intensive, the potential of point A will become lower than that of the point B. As a result, the transistors $Tr_1$ and $Tr_2$ are turned ON, and the lamp $L_1$ is lighted up. Owing to this lighted lamp $L_1$, the photographer will be able to learn that, if the shutter is released under this condition, there will be an over-exposure.

By moving the releasing lever 1 further toward the left side, the connections of the changeover switches $SW_2$ and $SW_3$ are switched over from the terminals a to the terminals b, respectively. As a result, the reference resistor $R_2$ for detecting camera-shake and the lamp $L_2$ are both connected to the checking circuit. If, at such a time, the light coming from the object of photography and irradiating the photocell Rx is too weak, the potential of the point A will become higher than that of the point B. As a result, the transistors $Tr_1$ and $Tr_2$ will be turned OFF, whereas the transistor $Tr_3$ will be turned ON, and the lamp $L_2$ will be lighted up. Therefore, the photographer will become aware from this lighted lamp that, if the shutter is released under such a condition, there will be the possibility of camera-shake.

As stated above, according to the present invention, the properness of the exposure condition is first checked by the checking circuit and then the release lever 1 is pushed toward the left side, which causes the arm 6b to be pushed by the pin 1c so that the changeover lever 6 is rotated clockwise. As a result, the connection of the power switch $SW_4$ for the exposure time control circuit and the connections of the changeover switches $SW_5$ and $SW_6$ are switched from the terminals a to the terminals b. Under this state, the switch $SW_7$ still remains to be closed. Therefore, the potential of the point A is held lower than that of the point B, and the transistors $Tr_1$ and $Tr_2$ are ON whereas the transistor $Tr_3$ is turned OFF so that the electromagnet M is energized. Accordingly, this electromagnet M magnetically holds toward it the bent portion 16a of the magnet lever 16 in FIG. 2. Thereafter, the bent portion 1e of the release lever 1 pushes the arm 18a to rotate the holding lever 18 clockwise while rendering the spring 19 tensioned. In the final stage of the leftward movement of the release lever 1, the end portion 1f pushes the bent portion 3a to cause the open-shutter locking lever 3 to be rotated clockwise against the force of the spring 5. Owing to this movement of the locking lever 3, the hook portion 3B of the locking lever 3 is relieved of its engagement with the arm 9C of the shutter operating lever 9. As a result, the shutter operating lever 9 is rotated quickly counter-clockwise by the force of the spring 12, and the shutter blades not shown are opened by the pin 9e. Since the switch $SW_7$ is opened as the shutter operating lever 9 is rotated counter-clockwise, the capacitor C begins to be charged through the photocell Rx.

In the aforesaid state, the force with which the release button of the camera (not shown) has been depressed may be removed. Whereupon, the release lever 1 is caused to move toward the right side by the spring 2 to resume its position shown in FIG. 2. Also, the switches $SW_1$, $SW_2$ and $SW_3$ return to their state shown in FIG. 2. However, the stepped portion 6d of the changeover lever 6 is still in engagement with the bent portion 9b of the shutter operating lever 9, preventing the counter-clockwise rotation of this changeover lever 6, and therefore, the switches $SW_4$, $SW_5$ and $SW_6$ are retained in their state of being connected to the terminals b. Accordingly, during the returning of the switches $SW_1$, $SW_2$ and $SW_3$ to their initial state, the lamps $L_1$ and $L_2$ will never be lighted up under any conditions. When the release lever 1 returns to the right side, the holding lever 18 also tends to rotate counter-clockwise by the force of the spring 20. However, the bent portion 18b of the holding lever 18 is in engagement with the arm 9d of the shutter operating lever 9, so that the rotation of this holding lever 18 is prevented.

As the potential of the point A becomes lower than that of the point B with the progress in the charging of the capacitor C, the transistor $Tr_1$ and $Tr_2$ are turned ON whereas the transistor $Tr_3$ is turned OFF, so that the electromagnet M is de-energized. As a result, the magnet lever 16 is caused to rotate clockwise quickly by the force of the spring 19. Simultaneously therewith, the closed-shutter locking lever 14 also is rotated clockwise as its bent portion 14b is pushed by the magnet lever 16. As said closed-shutter locking lever 14 rotates clockwise, its stepped portion 14a is relieved of its engagement with the arm 11b of the shutter-closing driving lever 11. Accordingly, said shutter-closing driving lever 11 is rotated quickly clockwise by the force of the spring 13. As a result, said shutter operating lever 9 also is rotated quickly clockwise as the arm 9c thereof is pushed by the bent portion 11a. Eventually, the shutter blades are closed by the pin 9e.

As the shutter operating lever 9 is rotated clockwise, the switch $SW_7$ is closed as it is engaged by the bent portion 9a of said lever 9, so that the capacitor C is discharged. Furthermore, as this shutter operating lever 9 is rotated clockwise, the bent portion 9b of said lever is relieved of its engagement with the stepped portion 6d, and therefore, the changeover lever 6 is rotated counter-clockwise by the force of the spring 8. Accordingly, the connections of the switches $SW_4$, $SW_5$ and $SW_6$ are switched from the terminals b to the terminals a by the bent portion 6c. A further clockwise rotation of said shutter operating lever 9 causes the bent portion 18b to be relieved of its engagement with the arm 9d. As a result, the holding lever 18 is rotated counter-clockwise by the force of the spring 20. During this part of operation, the magnet lever 16 is rotated counter-clockwise by the bent portion 18c to bring its bent portion 16a into contact with the electromagnet M. Toward the end of the clockwise rotation of the shutter operating lever 9, its arm 9c crosses over the hook portion 3b of the open-shutter locking lever 3 and assumes the position shown in FIG. 2 at which the lever 9 is locked by said locking lever 3.

In order to cock the shutter, it is only necessary to rotate the shutter-closing driving lever 11 counter-clockwise against the force of the springs 12 and 13 and to thereby bring the arm 11b of said lever 11 into engagement with the stepped portion 14a of the closed-shutter locking lever 14. As a result, all the elements of the mechanism are placed in the state shown in FIG. 2.

I claim

1. An electronic shutter for a photographic camera comprising:
   A. an exposure-time control circuit comprising:
      A1. a delay circuit consisting of a photo-conductive element and a capacitor,
      A2. a switching transistor circuit connected to be operated via said delay circuit,
      A3. an electromagnet connected to an output terminal of said switching transistor circuit for controlling the time for starting to close a shutter blade,
   B. shutter-driving means for opening and closing the shutter blade,
   C. manually operated release means having a non-operated position, a first operated position, and a second operated position occurring after the first position has been passed,
   D. first power switch means associated with said release means for opening and closing said exposure time control circuit and being closed when the shutter blade is opened and then being held in its closed condition by said shutter driving mechanism until the closing of the shutter blade,
   E. a first resistor selectively connectable in series with said photoconductive element for warning of possible danger from shaking the camera,
   F. a second resistor selectively connectable in series with said photoconductive element for warning of danger of over-exposure,
   G. a first lamp connected to said switching transistor circuit for warning of possible danger from shaking of the camera,
   H. a second lamp connected to said switching transistor circuit for warning of danger from over-exposure,
   I. second power switch means for checking exposure conditions, connected in parallel with said first power switch means and arranged to be closed during the initial stage of the releasing operation of said release means and to be opened upon the freeing of the releasing operation,
   J. a first checking switch means for checking exposure conditions and being operable to sequentially connect with said first and second resistors by the operation of said release means upon the closing of said first power switch means,
   K. a second checking switch means for checking exposure conditions operable simultaneously with said first switch means and sequentially connectable with said first and second lamps, L. a first changeover switch means adapted to switch a circuit including said first and second resistors and said first switch means to a circuit including said capacitor by the release means after the operation of said two switch means has been completed but before said shutter driving mechanism is released, whereby this state is retained by said shutter driving mechanism until the closing of said shutter blade, and M. a second changeover switch means operable to function simultaneously with said first changeover switch means and operable to connect with said electromagnet in place of a circuit including said second switch means and said first and second lamps, said release means functioning, when operated from the non-operated position to the first position, to cause both checking means to function, whereby a photographer can examine the indicating means to decide whether to make an exposure, said release means functioning, when permitted to return directly to said non-operated position from said first position without entering said second position, to allow said camera to make no exposure, said release means functioning, when operated from the first position to the second position, to initiate and to cause the exposure-time control means to control the time duration of an exposure.

* * * * *